Figure 1:
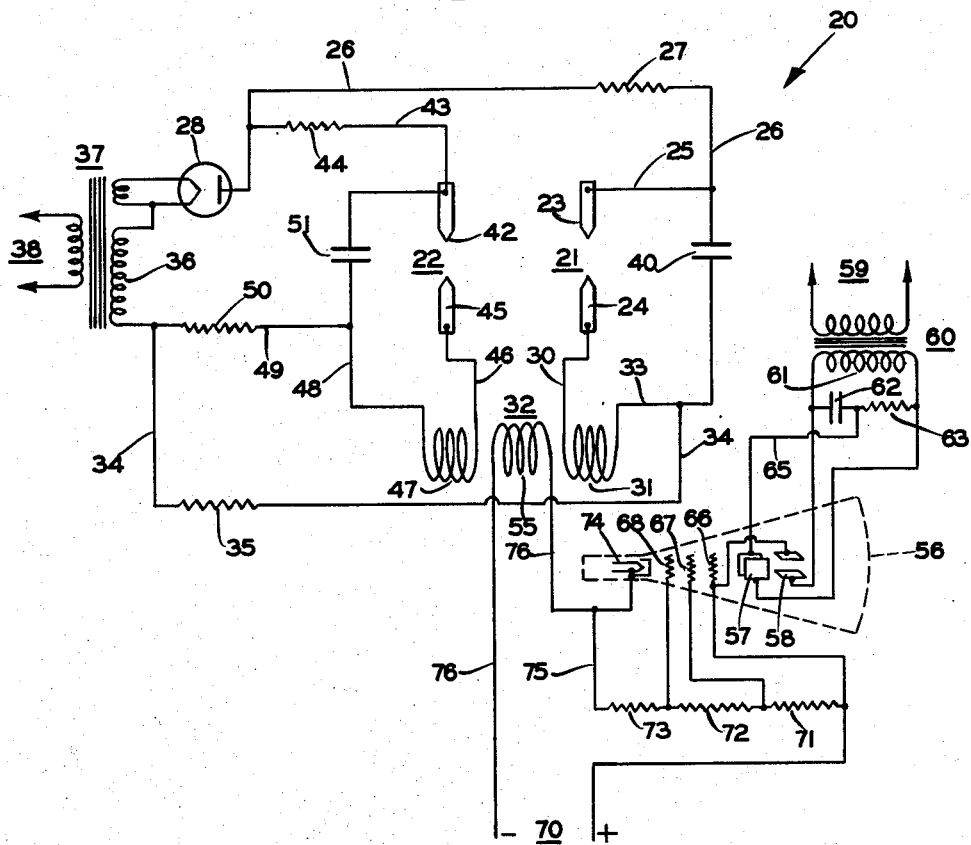

May 25, 1954     A. A. STUART     2,679,162
IONIZING TRUE AIR-SPEED INDICATOR

Filed June 16, 1948     4 Sheets-Sheet 1

INVENTOR
ALFRED A. STUART
BY
ATTORNEY

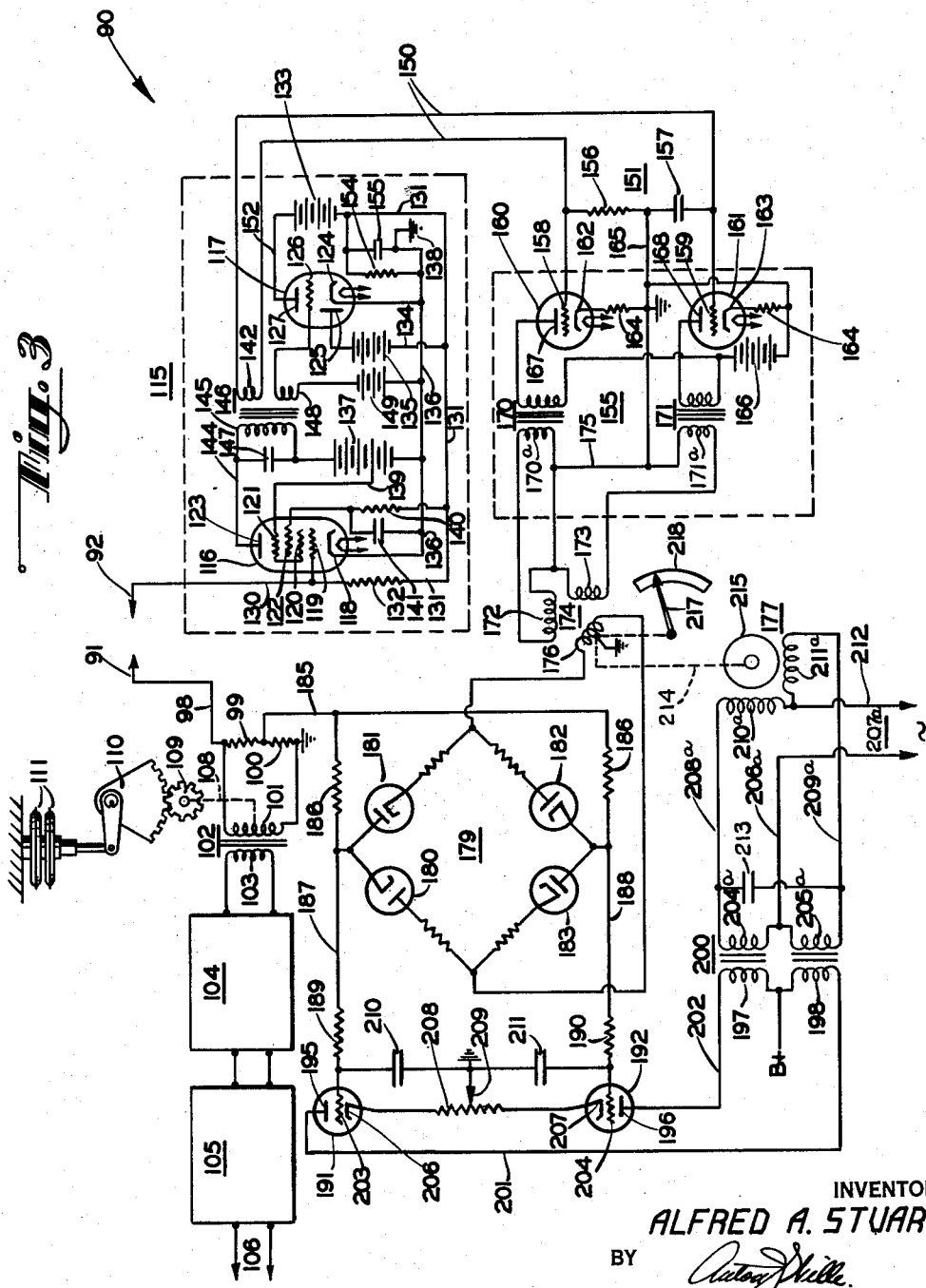

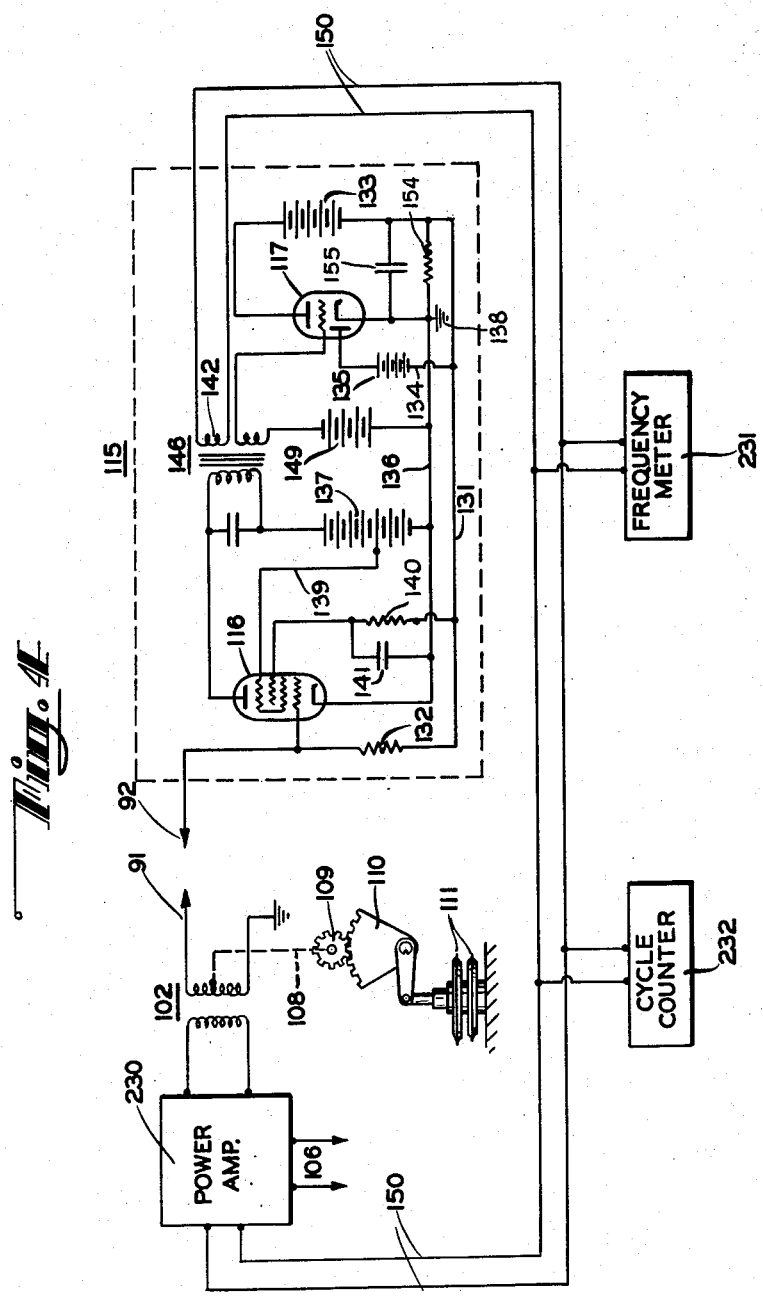

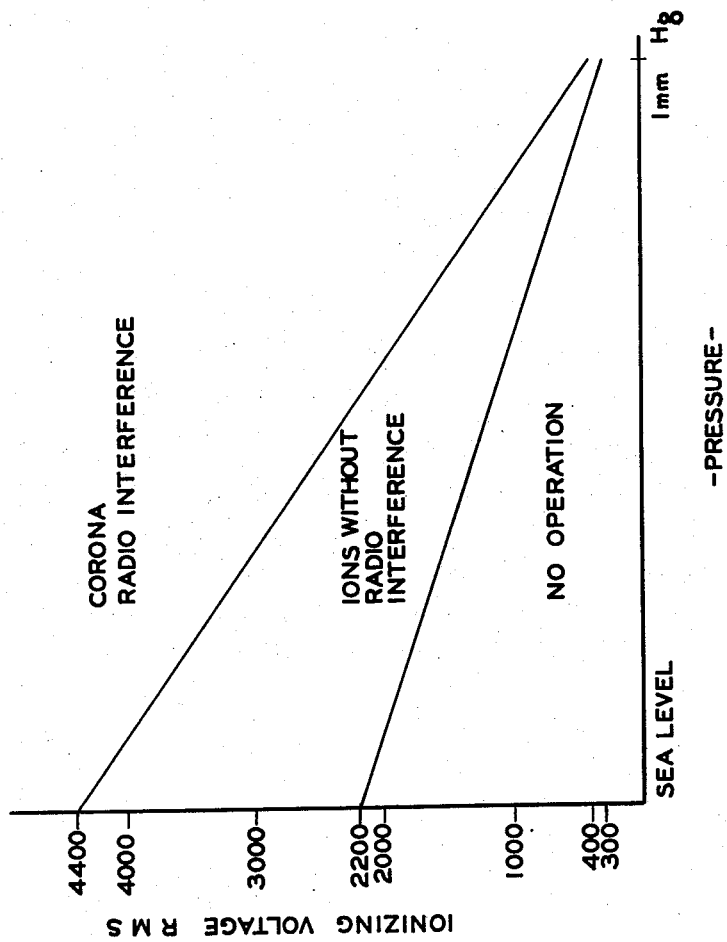
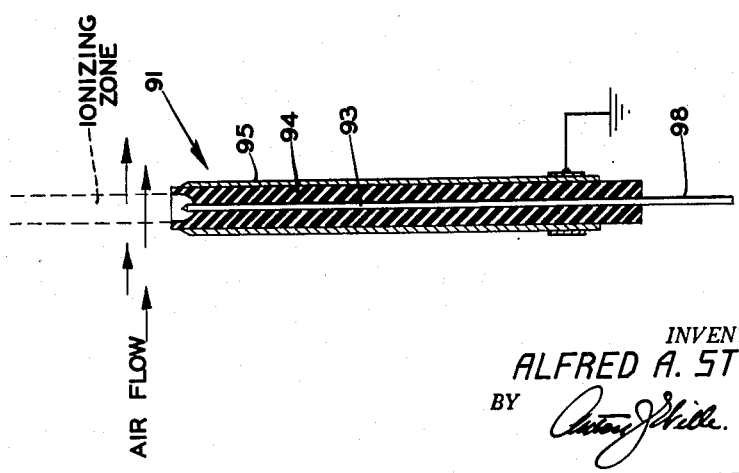

Patented May 25, 1954

2,679,162

UNITED STATES PATENT OFFICE 2,679,162

IONIZING TRUE AIR-SPEED INDICATOR

Alfred A. Stuart, Ridgewood, N. J., assignor to Bendix Aviation Corporation, Teterboro, N. J., a corporation of Delaware Application June 16, 1948, Serial No. 33,390

10 Claims. (Cl. 73—194)

This invention relates to a method and means for measuring the velocity of a flowing fluid medium, and more paritcularly to a true airspeed meter for indicating the velocity of aircraft in the subsonic, sonic and supersonic ranges of airspeed.

Prior devices for measuring the velocity of a fluid medium, excluding the vane and impeller types, relied upon the differential in the ambient or static pressure and the impact or dynamic pressure of the gas or liquid measured. Such measuring instruments were susceptible to serious errors due to the changes in the temperature and the density of the fluid medium. Various expedients were thus required to correct the readings of these meters.

In the airspeed meters used for indicating the velocity of an aircraft, compensation for air temperature and air density is required to obtain a true airspeed indication. The present airspeed instruments are normally provided with a differential pressure responsive member subjected to dynamic pressure on one side and static air pressure on the other. A pointer driven over a calibrated dial by the movement of the differential pressure member would show indicated airspeed in contradistinction to true airspeed. In order to compensate for the errors arising by the varying ambient conditions, two aneroid capsules are ordinarily provided together with interconnecting linkages to correct the meter readings for the temperature and density variations of the air. Further compensation is also provided by the use of bimetal strips and/or pivots to correct for the ambient temperature of the instrument case.

While the present day airspeed meter, when compensated as indicated, does provides a fairly accurate reading of the true airspeed of a craft, the present development of the turbine and jet engines and the use of rocket power to propel aircraft beyond the sonic barrier, has made the use of pressure responsive airspeed meters impractical. At subsonic, sonic, and supersonic speed levels attained by the new engines developed, and at the extreme high altitudes of flight now made and contemplated, the pressure responsive members as now used in airspeed meters are inaccurate and rupture easily.

It is, therefore, an object of my present invention to provide a meter for indicating the velocity of a fluid which is independent of the pressure of the flowing fluid.

Another object of my present invention is to provide a fluid velocity meter of the general character indicated which is independent of the temperature and/or the density of the flowing fluid.

Still another object of this invention is to provide a fluid velocity meter of the character indicated which shall be well adapted for use as a true airspeed meter for indicating the airspeed of aircraft at the subsonic, sonic, and supersonic speed levels and at all altitudes of flight level.

Yet another object of the invention is to provide a true airspeed meter for aircraft which shall be unaffected by shock waves encountered in entering and passing through the sonic speed barrier.

And still another object of my invention is to provide a true airspeed meter of the character indicated which shall not produce radio interference.

A further object of my present invention is to provide a fluid velocity meter of the character indicated in which the fluid medium is electrostatically charged, the velocity of the fluid medium being a measure of the time interval required for the charges to be carried between two known points.

Still a further object of my invention is to provide a fluid velocity meter of the character indicated in which the transit time of the electrostatic charges provides a time phase delay which is a measure of the velocity of the fluid medium.

Yet a further object of this invention is to provide a fluid velocity meter of the character indicated in which the transit time of the electrostatic charges provides a frequency change in a metering circuit which is a measure of the velocity of the fluid medium.

And another object of this invention is to provide a fluid velocity meter of the character described in which the transit time of the electrostatic charges may be indicated on a cathode ray screen.

Yet another object of this invention is to provide a fluid velocity meter of the character described in which the velocity of the fluid medium may be indicated directly in linear distance per unit of time.

Still another object of my present invention is to provide a true airspeed meter incorporating the features described which shall be automatic and positive in its operation, relatively inexpensive to manufacture, which shall consist of few and simple parts and circuit elements, light in weight and small in size, which shall have a large variety of applications, and yet be practical and efficient to a high degree in use.

Other objects of this invention will in part be obvious, and in part hereinafter pointed out.

In carrying out one embodiment of my invention, I provide an ionization source which comprises, in this instance, a spark gap in the stream of the fluid medium. Downstream at a fixed distance from the first spark gap, I place a second spark gap. The first spark gap is adjusted to fire periodically by means of predetermined electrical circuit constants. The periodic firing of the first spark gap will provide an interrupted stream of ions which is carried by the fluid medium. The second spark gap is adjusted so as not to fire unless a group of ions, carried by the fluid medium upon discharge of the first gas, is between the electrodes. As the ions traverse the second spark gap, its sparking potential will be lowered due to the presence of the ions, resulting in a discharge of the second spark gap.

Knowing the distance between the two spark gaps, the transit time of the ions and thus of the fluid of which they are a part can be measured and the velocity determined. A cathode ray tube having a circular pattern may be used for determining the velocity of the fluid medium. The discharge of the first gap provides a voltage pulse which will momentarily reduce the voltage applied to the electrodes of the cathode ray tube causing the cathode spot to move radially outwardly from the sweep circle. The discharge of the second gap will also provide a pip in the sweep circle of the cathode ray tube, the angular separation of the two pips being inversely proportional to the true velocity of the fluid medium.

As an alternative method of the first embodiment of my invention, the second spark gap may be replaced by a single electrode. The electrode or probe will collect a charge due to the electrostatic charges of the first spark gap. This induced impulse may be suitably amplified and serve as the signal to produce the second pip on the cathode ray tube.

In a second embodiment of my present invention, I dispense with the spark or spark gaps of the first embodiment for either generation or detecting the flow of ions. In my second embodiment I employ a novel electrode placed upstream in the fluid medium. The electrode is insulated from ground and supplied with a sufficiently high potential source to provide the electrostatic charges. The high potential source is varied in a periodic manner and may be either positive or negative, or alternating. The receiving electrode is fixed downstream at a predetermined distance from the ionizing electrode. The ions collected by the receiving electrode will charge this electrode to a potential varying in the same manner as the potential impressed upon the ionizing electrode. The two potentials will vary in phase equal to the transit time of the ions. The induced potential of the electrode is amplified by an electronic circuit and applied to a phase measuring circuit whereby the true velocity of the fluid is indicated in linear distance per unit of time. In the description hereinafter given, this arrangement briefly described will be referred to as the phase shift method.

In a third embodiment of my invention in which the ionizing and receiving electrodes are used, the induced potential of the receiving electrode is amplified, the amplified voltage supplying the power for the ionizing electrode. In this arrangement an oscillator device is provided, the frequency of the oscillations being a measure of the true velocity of the fluid medium. In the detailed description hereinafter made, this arrangement of my invention will be referred to as the oscillator method.

In carrying out my invention and applying the same to a true airspeed indicator for aircraft, I have found that serious radio interference is caused when the potential supplied to the ionizing electrode is of such a high value that a corona discharge takes place. The potential supplied to my novel ionizing electrode is maintained at the pre-corona level. As will hereinafter be more fully set forth, the ionizing potential required decreases with the decrease in atmospheric pressure. A pressure responsive member is included in my true airspeed meter to vary the ionizing potential to a pre-corona value as changes in altitude take place.

Figure 2:
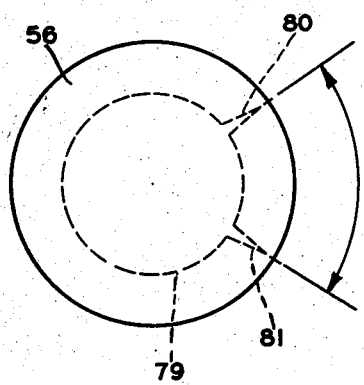

In the accompanying drawings forming a part of this specification, in which several possible illustrative embodiments of this invention are shown, and wherein similar reference characters designate corresponding parts throughout the several views, Fig. 1 is a schematic wiring diagram illustrating the use of two spark gaps in carrying out my invention, Fig. 2 is a front view of a cathode ray tube showing the visual indication given thereby for indicating the fluid velocity, Fig. 3 is a schematic wiring diagram illustrating the use of a high potential electrode and a pickup electrode in carrying out the phase shift method of the invention, Fig. 4 is a wiring schematic diagram illustrating the frequency method of my invention, Fig. 5 is a longitudinal sectional view of a novel ionizing electrode, while Fig. 6 is a graph showing the ionizing and corona levels of potential with respect to atmospheric pressure.

Referring now in detail to Figs. 1 and 2 of the drawings in which one of the various possible embodiments of my invention is illustrated, the numeral 20 indicates a circuit for measuring the speed of a fluid flowing past a stationary object, or the speed of an object, such as an aircraft through a fluid medium.

The circuit 20 includes two spark gaps 21 and 22, spaced a short distance apart, say approximately two inches, and placed in the stream of the fluid medium. The spark gap 21 will hereinafter be referred to as the firing gap and is placed upstream of the receiving or pickup spark gap 22.

The firing gap 21 comprises two electrodes 23 and 24 connected across a high source of potential. The electrode 23 is connected by leads 25 and 26 through a resistor 27 to the plate of a half wave rectifier 28. The electrode 24 is connected by a lead 30 through a primary winding 31 of a transformer 32, and thence by leads 33 and 34 through a resistor 35 to the cathode of tube 29 through the secondary winding 36 of a step up transformer 37 connected across an alternating current power supply 38. A condenser 40 connected across the spark gap 21 by the leads 26 and 33 completes the firing gap circuit.

The pickup gap 22 is similarly connected across the power supply 38, 37, 28 and to the transformer 32. The electrode 42 is connected by a lead 43 through a resistor 44 to the plate of the diode 28, while the electrode 45 is connected by a lead 46 through a second primary winding 47 on the transformer 32 and by leads 48, 49 through a resistor 50 to the cathode of the diode 28. A condenser 51 is connected across the pickup gap by the leads 43 and 48.

The two spark gaps are placed in line with respect to the flow of the fluid medium. By proper selection of the circuit constants, the firing gap is adjusted to fire periodically, while the pickup gap is adjusted so that it will not fire until a group of ions formed by the discharge of the firing gap is carried downstream by the fluid medium and passes between the electrodes 42, 45. The charging rate of condenser 40 is determined by the value of the two series connected resistors 27 and 35. Thus the periodic firing of the spark gap 21 due to the discharge of condenser 40 will provide a group of ions periodically which is carried downstream by the fluid to pass between the electrodes 42, 45 of the pickup gap.

The discharge of the pickup gap is adjusted by the proper selection of impedance values of the series resistors 44 and 50, and of the condenser 51. The values are so chosen that the spark gap 22 will not fire until a group of ions resulting from the discharge of the firing gap passes between the electrodes. The group of ions between the electrodes will reduce the resistance of the gap thereby reducing the required sparking potential. This potential is provided by the charged condenser 51 and results in the firing of the pickup gap.

Since the sequential firing of the two spark gaps provides a surge of current in the spark gap circuits, and knowing the distance at which the gaps are spaced apart, the velocity of the fluid medium may readily be determined by measuring the time interval between the current surge due to the firing gap and the current surge of the resultant firing of the pickup gap.

To this end the transformer 32 is provided, the two primary windings 31 and 47 of which are connected in the respective spark gap circuits. A single secondary winding 55 is provided on the transformer in which voltage surges are induced upon the sequential firing of the two spark gaps provided. The output of the transformer 32 is applied to the control grids of a cathode ray tube 56 to present a visual indication of the elapsed time interval, of the velocity of the fluid.

The cathode ray tube 56 is provided with the horizontal deflector plates 57 and the vertical deflector plates 58 supplied from a suitable source of A. C. potential 59 through a transformer 60. The secondary winding 61 of the transformer is shunted by a series connected condenser 62 and a resistor 63. The ends of winding 61 are connected to a deflector plate 57 and 58, while a tap off between the condenser 62 and resistor 63 is connected by a lead 65 to the second deflector plate 57. The second deflector plate 58 is connected internally to anode 66 of the tube. The anode 66, the focusing electrode 67 and the grid 68 are connected to a D. C. high voltage supply 70 through series connected dropping resistors 71, 72, and 73, respectively. The end of resistor 73 is connected to the indirectly heated cathode 74 of the tube by a lead 75, and via lead 76 and the secondary transformer winding 55 to the negative side of the voltage supply 70. The impedance values of the condenser 62 and the resistor 63 are so chosen that a circular sweep pattern 79 is produced upon the screen of the cathode tube. (Fig. 2.)

The surges of voltage induced in the secondary winding 55 of the coupling transformer due to the discharge of the spark gaps 21 and 22, are applied in series with the high voltage source 70 to the control electrodes of the cathode tube 56. The surge of voltage due to the discharge of the firing gap 21 will momentarily lower the voltage applied to the electrodes, causing the cathode spot to move radially outwardly from the sweep circle to form a "pip" 80 on the screen (Fig. 2). The resulting discharge of the pickup electrode 22 will form a second "pip" 81 on the screen. Since the distance between the two spark gaps is known, the angular distance between the two "pips" on the cathode tube screen would be indicative of the elapsed time taken for a group of ions to travel from the firing gap 21 to the pickup gap 22. The angular separation of the two pips is therefore inversely proportional to the velocity of the fluid medium flowing past the two spark gaps.

As an alternative method of carrying out the first embodiment described, the receiving spark gap 22 may be replaced by an electrode or probe. The charges collected by and/or induced in the pickup electrode may be amplified and applied to the cathode ray tube to provide the second pip 81 on the screen.

Referring to Fig. 3 of the drawings in which a second embodiment of my invention is shown, the numeral 90 designates a circuit interconnecting a pickup electrode 92 and a novel ionizing electrode 91, more fully shown in Fig. 5, and described and claimed in co-pending application Serial No. 132,125, filed December 9, 1949, now Patent Number 2,602,910, issued July 8, 1952. The ionizing electrode 91 comprises a metallic needle tipped electrode 93 incased in a sleeve 94 of insulating material, and a grounded metallic shroud 95 encircles the insulating sleeve. The sleeve extends a slight degree beyond the needle point of the electrode 93, the shroud 95 tapering off toward the upper edge of the sleeve. The end of the ionizing electrode is placed in the slipstream of the fluid medium, the shroud and the sleeve insulating the electrode from its surrounding holder and preventing any arcing between the electrode and the adjacent surfaces.

The ionizing electrode 91 is connected by a lead 98 to the positive side of a grounded voltage divider comprising the two series connected resistors 99 and 100. The voltage divider 99, 100 is connected across the secondary winding 101 of a high voltage rotary transformer 102, the purposes of which will hereinafter be described. The primary winding 103 of the transformer is connected across the output of a conventional power amplifier 104, here shown in block diagram form. The input of the power amplifier is provided by a conventional oscillator 105, the oscillator and amplifier being connected to a source of suitable power supply 106. A high, periodically varying voltage is thus supplied to the ionizing electrode 91 to permit ionization of the fluid medium. The potential supplied to the ionizing electrode must be varied in a periodic manner, and may be either positive or negative, or reversing.

It has been found in applying my invention to an airspeed indicator, that atmospheric pressure will affect the ionizing of the air. At pressures approximating atmospheric pressure at sea level, ionization of the air would require a potential of approximately 2200 volts R. M. S.; no ionization taking place below this value. An increase in the ionizing potential to approximately 4400 volts R. M. S. produces the required ions for the satisfactory operation of the device as an airspeed indicator for aircraft. The increase of the potential supplied to the ionizing electrode beyond the latter figure causes corona discharge which produces severe radio interference.

As the ambient pressure decreases, the ionizing potential required decreases. The ionizing potential required at an altitude approximating an atmospheric pressure of 1 mm. Hg is about 300 volts R. M. S., while corona discharge will begin at a supply potential of about 400 volts R. M. S. at this pressure. Thus for increasing altitude of an aircraft, a zone of operation (Fig. 6) exists in which ions will be produced without corona discharge.

The rotary transformer 102 is provided to maintain the ionizing potential applied to the electrode 91 within the limits indicated in Fig. 6 to provide ionization without corona discharge. The secondary winding 101 of the transformer is capable of being angularly displaced with respect to the stationary primary winding 103. The secondary winding is coupled by suitable means indicated by the dashed line 108 to a pinion 109 and gear sector 110. The sector 110 is adapted to be oscillated by the expansion and contraction of an aneroid capsule 111 whose exterior surface is subjected to atmospheric pressure.

The changes in atmospheric pressure will, through the expansion and contraction of the aneroid, cause an angular displacement of the secondary winding 101 of the transformer with respect to the primary winding 103. The resultant decoupling of the two windings will reduce the voltage induced in the secondary winding. The potential supplied to the ionizing electrode 92 will be reduced as the altitude increases and will lie within the operational zone shown in Fig. 6 in which the required ions will be produced without the interfering corona discharge.

The pickup electrode 92 is placed downstream from the ionizing electrode 91. The electrode 92 is needle-pointed and may extend to a slight degree into the slipstream. The electrode is suitably insulated from its support (not shown) and is electrically connected to the input of a volume compressor or limiter circuit 115 comprising the multi-element tubes 116 and 117 and described and claimed in co-pending application Serial No. 132,126, filed December 9, 1949, now abandoned.

The tube 116 is a variable mu tube preferably of the 6L7 type and comprises an indirectly heated cathode 118, a control grid 119, two screen grids 120 and 121 separated by a second control grid 122, and a plate 123. The tube 117 comprises an indirectly heated cathode 124, a plate 125, a control grid 126 and a second plate 127; the cathode 124 and plate 125 forming a diode section, the cathode 124, the grid 126 and the plate 127 forming a triode section.

The pickup electrode 92 is connected by a wire 130 to the control grid 119 of the tube 116. The control grid is connected through a lead 131 and a resistor 132 to the negative side of a battery 133; and by the lead 131 and a lead 134 to the negative side of a battery 135, the positive side of said battery being connected to the plate 125 of the tube 117. The cathode 118 is connected by a lead 136 to the negative side of a battery 137, the lead 136 being grounded as at 138. The screen grids 120 and 121 are internally connected and receive their bias supply from the battery 137 via a lead 139. The second control grid 122 is connected through a resistor 140 to the lead 131 and through a condenser 141 to the grounded lead 136. The plate 123 is connected by a lead 144 through the primary winding 145 of a transformer 146, to the positive side of the battery 137; a condenser 147 connected in parallel with the primary winding 145 forming a tuned circuit.

The control grid 126 of the tube 117 is connected to a secondary winding 148 of the transformer 146, the bias supply being a battery 149. A second secondary winding 142 of the transformer 146 is connected by leads 150 to a phase splitting circuit generally designated by the numeral 151. The plate 127 of the tube 117 is connected by a lead 152 to the positive side of the battery 133. The cathode 124 is connected via the lead 136 through a parallel connected resistor 154 and a condenser 155 to the negative side of the battery 133.

The tube 116 is operated in the manner of a remote cut-off pentode in which an extremely negative bias is required to cut off all of the plate current. The normal bias for the control grids 119 and 121 is supplied by the battery 135 via the leads 134 and 131. The large bias for cut-off is supplied by the battery 133 in the manner to be described in connection with the operation of tube 117, the triode section of which is biased to cut-off by the battery 149.

The charges collected or induced in the pickup electrode 92 are impressed on the control grid 119. The alternating signal voltage thus provided is not applied to the second control grid 122 in view of the high resistor 132 placed in the series circuit interconnecting the two grids. The plate current of tube 116 flowing through the output transformer 146 as a result of this signal voltage will induce a voltage in each of the secondary windings 148 and 142. The voltage induced in the winding 148 is applied to the grid 126 of the triode section of the tube 117. When the output signal in transformer winding 148 exceeds a predetermined value, the positive signal peaks drive grid 126 positive and lowers the plate resistance of tube 117. This condition causes battery 133 to apply a more negative bias to grid 119 than battery 135. The diode section of tube 117 functions as a rectifier and prevents low voltage battery 135 from short circuiting high voltage battery 133.

There is thus applied across the leads 150 a voltage of constant amplitude resulting from the collected or induced charges on the pickup electrode 92. The phase of the signal voltage will be shifted with respect to the phase of the voltage applied across the voltage divider 99, 100, the degree of phase shift depending upon the spacing of the two electrodes and the velocity of the fluid medium carrying the ions. The distance between the two electrodes being known, a comparison of the two phases will give the velocity of the fluid medium.

To measure the phase shift of the signal voltages there is now provided the phase splitter circuit 151 and a dual channel amplifier generally designated by the numeral 155. The phase splitter circuit comprises a resistor 156 and a condenser 157 connected in series across the leads 150, the leads 150 being connected to the respective grids 158 and 159 of the two triodes 160 and 161 of the amplifier. The indirectly heated cathodes 162 and 163 of the amplifier tubes are connected through cathode resistors 164 to a grounded lead 165 connected to the junction point of the resistor 156 and condenser 157 of the phase splitter circuit. A battery 166 forms the B+ supply for the plates 167 and 168 of the two triodes. The output circuit of the two triodes is impressed across the primary windings of two output transformers 170 and 171, the secondary windings 170a, 171a of which are connected to the grounded lead 165.

Due to the action of the phase splitter circuit 151, the signals impressed on the input of tubes 160, 161 are 90° out of phase. The amplified signals induced in the secondary windings 170a, 171a of the transformers 170, 171 are also 90° out of phase with respect to each other.

The two out of phase signals are now impressed across the stator windings 172 and 173, respectively, of a two phase rotary induction device 174 of the inductive type resolver. The associated ends of the two windings are connected by a lead 175 to grounded lead 165. A rotor winding 176, center-tapped to ground and adapted to be rotated by a two phase induction motor 177, will have a constant voltage induced therein whose phase will be dependent upon the angular disposition of the rotor winding with respect to the two stator windings.

The signal induced in rotor winding 176 is impressed across the diagonals of a phase discriminating bridge circuit 179 comprising four diodes 180, 181, 182 and 183 connected in the four arms of the bridge to compare the phases of the signal voltage and reference voltage, and provide a D. C. voltage when the signals are other than 90° out of phase. The opposite diagonals of the bridge are connected by the leads 185 through suitable resistances 186 to the high side of resistor 100 of the voltage divider. These points on the bridge are further conected by leads 187 and 188 through filters including condensers 210, 211 and resistors 189, 190 to the input control grids 203, 204 of two parallel connected triodes 191 and 192.

The plates 195 and 196 of the two triodes are connected through the primary windings 197 and 198 of a saturable reactor 200 to B+ supply by the respective leads 201 and 202. The indirectly heated cathodes 206 and 207 are connected together through a cathode biasing resistor 208. A variable tap 209 for balancing the tube outputs is connected to ground and to the grid leads 187 and 188 through the condensers 210 and 211. The resistor 189 and condenser 210, and the similar elements 190, 211, form a filter circuit for removing any ripple appearing in the output circuit of the bridge 179.

The saturable reactor 200 is provided with two secondary windigs 204a and 205a connected in series and center-tapped to a lead 206a connected to a suitable source of A. C. potential 207a. The other ends of the windings 204a and 205a are connected by the respective leads 208a and 209a to the two phases 210a and 211a of the induction motor 177, the junction point of the two phases being connected by a lead 212 to the other terminal of the power supply 207a. A phasing condenser 213 is connected across the leads 208a, 209a to shift the phase of the current applied to the motor.

Through a suitable reduction gearing, herein indicated by the dashed line 214, the rotor 215 of the induction motor is coupled to the rotor 176 of the induction device 174. The rotor 176 in turn drives a pointer 217 over a calibrated scale 218 to indicate directly the velocity of the fluid medium measured, or, as in the case of a true airspeed indicator, the true airpeed.

Now the signal voltages induced in the rotor 176 of the rotary inductive device 174 as a result of the charge induced or collected by the pickup electrode 92 is applied across the diagonals of the bridge circuit 179. This voltage is compared by the bridge circuit as to phase with the phase of the voltage applied across the voltage divider 99, 100 by the amplifier 104. The reference voltage is applied to the opposite diagonals of the bridge circuit 179.

The signal voltage applied to the bridge circuit acts as a switching voltage which reduces the impedance of one half of the circuit permitting the tubes 180 and 181 to conduct during one half cycle, and permitting the tubes 182 and 183 to conduct during the other half cycle of the signal voltage. The reference voltage applied to the bridge circuit from the voltage divider will thus flow through the conducting half of the bridge circuit. Since this voltage is applied at a 90° phase angle with respect to the signal voltage, when the phase of the signal voltage and that of the reference voltage is 90° out of phase, the bridge circuit will be balanced and no voltage will be impressed on either of the grids 203 or 204.

When the bridge circuit 179 is unbalanced by the reference voltages being other than 90° out of phase, a D. C. voltage will appear in the output circuit thereof which is responsive to the phase difference of the two applied voltages. This voltage is then applied to the grids of the triodes 191 and 192, the filter circuits 189, 210 and 190, 211 removing the unwanted ripples.

The plate currents flowing in the windings 197 and 198 of the saturable reactor are equalized by adjusting the cathode resistor 208. The value of the plate current is such that when the bridge circuit 179 is balanced the cores of the reactors are saturated. The circuit comprising the windings 204a, 205a and the phases 210a, 211a of the motor is balanced and the rotor 215 is at a standstill.

Upon unbalance of the bridge circuit 179, positive and negative voltages will be applied to either of the grids 203 or 204 of the balanced triodes depending upon the degree of phase unbalance of the bridge circuit. The positive voltage on one grid and the negative voltage on the other will increase the impedance of one of the windings of the saturable reactor and decrease the impedance of the other winding. The motor 177 will thus be operated in a direction dependent upon unbalance of the bridge circuit 179. The rotation of the rotor 215 will position the rotor 176 of the inductive device 174 until the bridge circuit 179 is again balanced, i. e., when the reference voltage and signal voltages are 90° out of phase. With the bridge circuit 179 again balanced, the plate currents in windings 197 and 198 will again be balanced, halting the operation of the motor 177.

The positioning of the rotor 176 will also position the pointer 217 with respect to the dial 218. Since the phase angle between the signal voltages induced in the pickup electrode 92 and the reference voltage is directly proportional to the elapsed time for the ions to travel with the fluid medium from one electrode to another, the dial 218 may be laid off in units of linear distance per unit of time so that a reading of the pointer 217 with respect therewith will give the velocity of the fluid medium measured.

Referring now to Fig. 4 of the drawing in which the oscillator method of determining the fluid velocity is illustrated, the pickup electrode 92 is shown connected to the volume compressor circuit 115 previously described. The output leads 159 of the circuit 115 are connected to the input side of a power amplifier 230, the output of which supplies the primary winding of the high voltage transformer 102. The volume compressor 115 and the power amplifier 230 form an oscillating circuit in which the frequency of the oscillations will be dependent upon the total time delay. This delay comprises two time intervals, the one determined by the time required for the ions to travel from the ionizing electrode to the pickup electrode, the other by the properties of the electrical circuit. The time delay of the electrical circuit is substantially constant and may be disregarded except for calibration purposes, while the time delay due to ion transit time is dependent upon fluid velocity.

As in any oscillator circuit, the characteristics are such that upon closure of the power switch to the oscillator circuit, oscillations will begin. The frequency of the oscillations will depend upon the transit time of the ions from one electrode to the other, the feedback voltage provided by secondary winding 142 of the transformer 146 sustaining the oscillations.

A frequency meter 231 connected across the leads 150 will indicate the frequency of oscillations, or the velocity of the fluid. A cycle counter 232 also connected across the leads 150 will indicate the quantity of fluid, or, as in the case of an airspeed indicator, will indicate the distance flown.

In the description hereinbefore given, the ionizing electrode 91 and the pickup electrode 92 were placed in the stream of the fluid medium of which the velocity is to be determined. It has been found that the ionizing electrode may be placed adjacent to the fluid stream to provide the ionization required.

In the case of an airspeed indicator, the ionizing electrode would be recessed in a boom or within the body of the aircraft. The shaping of the electrode 91 and its insulating sheath and shroud are such that a narrow beam of ions is produced in the slipstream normal to the boom or aircraft skin. The pickup electrode 92 may be disposed in a similar recess, either open or covered over; the charge on the electrode being obtained by induction, rather than collection and induction as in the case where the probe extended into the airstream.

It will also be appreciated in connection with Fig. 3 of the drawings that the induced signal voltages impressed across leads 150 may be applied directly across the diagonals of the bridge circuit 179. In this instance, the voltage appearing across the resistor 100 would be applied to a phase splitter circuit 151, and applied to the two phases of the rotary inductive device 174. The reference voltages induced in the rotor 176 would then be applied to bridge circuit 179 to operate the pointer 217 in the manner described. The advantage of this method over that described is in the greater power available at the power amplifier 104 than across the secondary winding 142 of the compression circuit.

It will thus be seen that there is provided a velocity indicator in which the several objects of this invention are achieved, and which is well adapted to meet the conditions of practical use.

As various possible embodiments of the above invention might be made, and as various changes might be made in the embodiments above set forth, it will be understood that all matter herein set forth, or shown in the accompanying drawings, is to be interpreted as illustrative and not in a limiting sense.

Having thus described my invention, I claim as new and desire to secure by Letters Patent:

1. A fluid velocity meter comprising means for producing periodically at an upstream point in the flowing fluid a group of ions adapted to be carried downstream by the fluid medium, said means including a high voltage source; means for producing electrical impulses in response to the flow of each group of ions past a known point downstream from said first point, means responsive to both said first and second means for indicating the velocity of each group of ions carried by the fluid from said first point to said second point, and means responsive to the ambient pressure of the fluid to vary said high voltage source in correspondence to the ambient pressure of the fluid.

2. A fluid velocity meter comprising means for producing periodically at an upstream point in the flowing fluid a group of ions adapted to be carried downstream by the fluid medium, means for producing electrical impulses in response to the flow of each group of ions past a known point downstream from said first point, and means responsive to both said first and second means for indicating the velocity of each group of ions carried by the fluid from said first point to said second point; and means interconnecting said first two means and actuated by operation of one of said first two means to operate the other of said first two means.

3. A fluid velocity meter comprising means for producing periodically at an upstream point in the flowing fluid a group of ions adapted to be carried downstream by the fluid medium; said means including a high voltage source, means for producing electrical impulses in response to the flow of each group of ions past a known point downstream from said first point, means responsive to both said first and second means for indicating the velocity of each group of ions carried by the fluid from said first point to said second point; means interconnecting said first two means and actuated by operation of one of said first two means to operate the other of said first two means, and means responsive to the ambient pressure of the fluid to vary said high voltage source in correspondence to the ambient fluid pressure.

4. A meter for measuring the velocity of a fluid medium comprising an ionizing electrode, a pick-up electrode at a known distance downstream from the ionizing electrode adapted to have a voltage induced therein by the ions carried downstream by the fluid medium, an oscillator circuit interconnecting both said electrodes in which the voltage induced in the pick-up electrode forms the feedback voltage thereof, and a frequency meter connected into said oscillator circuit for indicating the frequency of oscillations of the circuit responsive to the fluid velocity.

5. A meter for measuring the velocity of a fluid medium comprising an ionizing electrode, a pick-up electrode at a known distance downstream from the ionizing electrode adapted to have a voltage induced therein by the ions carried downstream by the fluid medium, an oscillator circuit interconnecting both said electrodes in which the voltage induced in the pick-up electrode forms the feedback voltage thereof, a frequency meter connected into said oscillator circuit for indicating the frequency of oscillations of the circuit responsive to the fluid velocity, and a cycle counter connected into said oscillator circuit to indicate the number of oscillations.

6. A meter for measuring the velocity of a fluid medium comprising an ionizing electrode, a pick-up electrode at a known distance downstream from the ionizing electrode adapted to have a voltage induced therein by the ions carried downstream by the fluid medium from said first electrode, an amplifier connected and supplying high voltage to said ionizing electrode to ionize the fluid medium, said amplifier being connected to said pick-up electrode and forming an oscillating circuit to provide a variable high potential source for said ionizing electrode at a frequency dependent on the transit time of the ions carried from said ionizing electrode to said pick-up electrode, and means responsive to the frequency of oscillations of said circuit to indicate the velocity of the fluid.

7. An airspeed indicator comprising an ionizing electrode, a source of varying high voltage connected to said electrode to provide groups of ions in the airstream of a mobile craft, a pick-up electrode at a known distance downstream from said ionizing electrode adapted to have a voltage induced therein by the groups of ions carried past said electrode, means connected electrically to said ionizing electrode and to said pick-up electrode and responsive to the induced voltage to indicate airspeed, and means responsive to the altitude of the craft for varying the potential supplied to said ionizing electrode for maintaining the ionization at pre-corona levels.

8. An airspeed indicator comprising an ionizing electrode, a source of varying high voltage connected to said electrode to provide groups of ions in the airstream of a mobile craft, a pick-up electrode at a known distance downstream from said ionizing electrode adapted to have a voltage induced therein by the groups of ions carried past said electrode, means connected electrically to said ionizing electrode and to said pick-up electrode and responsive to the induced voltage to indicate airspeed, means connected electrically to said ionizing electrode and to said pick-up electrode and responsive to the induced voltage to indicate air mileage, and means responsive to the altitude of the craft for varying the potential supplied to said ionizing electrode for maintaining the ionization at pre-corona levels.

9. An airspeed indicator comprising an ionizing electrode, a source of varying high voltage connected to said electrode to provide groups of ions in the airstream of a mobile craft, means responsive to air pressure to vary the voltage of said source for maintaining the electrode at pre-corona levels, a pick-up electrode at a known distance downstream from said ionizing electrode adapted to have a voltage induced therein by the groups of ions carried past said electrode, and means connected electrically to said ionizing electrode and to said pick-up electrode and responsive to the induced voltage to indicate airspeed.

10. Apparatus for measuring the speed of relative movement between an object and a body of gas, said gas, due to said relative movement, moving in a stream past said object, said apparatus comprising means for ionizing a portion of said gas stream for a short period of time to create a cloud of ions in said gas stream, means predeterminedly spaced from said first-named means for detecting said ion cloud in said gas stream, said short period of time being less than the transit time of said ion cloud from its point of creation to said detecting means at the maximum speed of relative movement to be measured, means for amplifying ion currents picked up by said ion-detecting means, means controlled by said amplified currents for affecting said first-named means to cause the creation of a second cloud of ions, and means for measuring the frequency of creation of said ion clouds, said frequency being a function of the speed of relative movement between said gas and said body.

References Cited in the file of this patent

UNITED STATES PATENTS

| Number | Name | Date |
| --- | --- | --- |
| 689,199 | Kinraide | Dec. 17, 1901 |
| 1,411,796 | Meyer | Apr. 4, 1922 |
| 1,611,502 | Allen | Dec. 21, 1926 |
| 1,616,431 | Allen | Feb. 8, 1927 |
| 1,808,709 | Blake | June 2, 1931 |
| 2,019,333 | Auerbach | Oct. 29, 1935 |
| 2,175,335 | Andrieu | Oct. 10, 1939 |
| 2,267,120 | Mathes | Dec. 23, 1941 |
| 2,353,382 | Barrett | July 11, 1944 |
| 2,392,808 | Chapman | Jan. 15, 1946 |
| 2,569,974 | Campbell | Oct. 2, 1951 |